3,192,174
RESINS CONTAINING POLYCONDENSATION PRODUCTS WHICH HAVE BEEN MODIFIED BY AN ACIDIC COMPOUND TO IMPROVE AIR DRYING PROPERTIES
Gus Nichols, Whiting, Ind., assignor to Standard Oil Company, Chicago, Ill., a corporation of Indiana
No Drawing. Filed Mar. 19, 1962, Ser. No. 180,869
7 Claims. (Cl. 260—22)

This invention relates to resins suitable for the formation of air-dry surface coatings and particularly to resins containing polycondensation reaction products which have been modified by an acidic compound to improve their air-drying and other properties.

Resins containing polycondensation reaction products have been used in the past to provide coatings having air-drying properties and are considered important for use in both industry and the home. They include resins soluble in hydrocarbon solvents, commonly known as alkyd resins, and the more recent water soluble resins. The water soluble resins in general are derived from the alkyd resins by reacting them with an alkaline agent such as ammonia.

The air-drying properties of the resin coatings relate to the ability of the resin to form a rigid solid film when exposed to the atmosphere at ordinary temperatures, particularly 50°–100° F.

In the past, the time required for resin coatings prepared from polycondensation reaction products to become air-dry has not been entirely satisfactory. Many water soluble resins have required as much as 20 hours and more to dry. It is important that the air-drying properties of the resins be improved in order that their drying times be satisfactory for use in industry and the home. The faster the coating dries, the sooner the coated objects or surface can be utilized.

One object of this invention is an improvement in the air-drying properties of water soluble resins prepared from polycondensation reaction products. Another object of this invention is an improvement in the air-drying properties of organic solvent soluble resins prepared from polycondensation reaction products. Other objects will become apparent from the detailed description of this invention.

It has been discovered that the air-drying properties of a water soluble resin prepared from a polycondensation reaction product are improved by reacting the polycondensation reaction product with an acidic compound. The resulting resin is a novel water soluble resin which exhibits very good air-drying properties. It has also been discovered that the air-drying properties of an organic solvent soluble resin prepared from a polycondensation reaction product are improved by reacting the polycondensation reaction product with an acidic compound. The resulting resin is a novel organic solvent soluble resin which exhibits very good air-drying properties. It is important that the acidic compound be added to the polycondensation reaction product rather than to the starting materials for the polycondensation reaction product.

In general, the novel water soluble resin is prepared from the novel organic solvent soluble resin by reacting it with a hereinafter defined alkaline agent such as ammonia. The novel organic solvent soluble resin comprises the reaction product of (1) a polycondensation reaction product of a fatty acid group containing compound affording at least 2 hydroxy groups, a benzene polycarboxylic acid having from 2 to 4 carboxyl groups, and when the acid has 3 or 4 carboxyl groups, a monohydric alcohol, (2) an acidic compound or member having an organic or substituted organic nucleus and one or more acidic groups such as carboxyl groups, anhydride groups, and/or carbonyl halide groups. Generally, only a small amount of the acidic member is necessary in the reaction with the polycondensation reaction product to improve the air drying properties of the polycondensation reaction product and resin.

The air-drying properties of the resins of this invention are to be understood as indicating that when a surface coating film—for example, 3 mils thick—is formed from an organic solvent solution or water solution the film will harden and form a solid structure as afforded by present air-drying paints. The time needed for a film to become thoroughly dry will vary with the particular resin, the temperature to which the film is exposed, and the presence or absence of driers. The presence of cobalt and lead driers such as normally utilized in the paint industry permits the formation of dry films in periods of time permitting use on interior and exterior surfaces.

The novel organic solvent soluble resin comprises the reaction product of (1) a polycondensation reaction product of a compound affording at least 2 hydroxyl groups and containing an unsaturated fatty acid group, and a benzene polycarboxylic acid having from 2 to 4 carboxyl groups, and when the acid has 3 and 4 carboxyl groups, monohydric alcohol (a monohydroxyl member), the hydroxyl groups of the compound and any monohydric alcohol member being present in a ratio to the carboxyl groups of the acid of at least about 0.9, and (2) an acidic member having the formula $R(X)_n$ wherein R is an organic or substituted organic group, X is at least one member selected from the class consisting of a carboxyl group, an anhydride group, and a carbonyl halide group, and $n$ is an integer from 1 to about 6 when X is a carboxyl group and a carbonyl halide group and from 1 to about 3 when X is an anhydride group. In addition when $(X)_n$ is a single carboxyl group or carbonyl halide group, R is a non-aliphatic organic group.

The polycondensation reaction product results from the reaction of the above described compound and a benzene polycarboxylic acid having from 2 to 4 carboxy groups and when the acid has 3 or 4 carboxyl groups, a monohydroxyl member. The compound is generally derived from a polyhydric alcohol and an unsaturated fatty acid or oil. The polyhydric alcohol may be any one of the alcohols which contain at least 3 hydroxyl groups. Examples of typical polyhydric alcohols which have been used in the preparation of alkyd resins and may be used herein are glycerol, trimethylol ethane, trimethylol propane, erythritol, threitol, pentaerythritol, dipentaerythritol, sorbitol and mannitol.

The unsaturated fatty acid refers to acids derived from semidrying and drying oils used in the preparation of alkyd resins. A single fatty acid may be used or a mixture of fatty acids. When a single fatty acid is used, it is preferred that it has at least two olefinic bonds and at least about 10 carbon atoms. The fatty acids containing 16–24 carbon atoms and at least 2 olefinic bonds are particularly suitable and include such fatty acids as linoleic, hiragonic, eleostearic, moroctic, arachidonic, clupanodonic, and nisinic. Economical sources of the fatty acids are the natural mixtures of acids obtained from semi-drying and drying oils such as tall oil, soybean oil, linseed oil, tung oil, etc.

The compound may be prepared by the condensation reaction between the polyhydric alcohol and the fatty acid or by the alcoholysis of the fatty oil with the polyhydric alcohol. These procedures are known in the alkyd resin art.

The benzene polycarboxylic acid has from 2 to 4 carboxyl groups and includes not only those having a single phenyl nucleus but also those having a diphenyl nucleus and also those having another group positioned between the two phenyl groups in the diphenyl nucleus. The benzene dicarboxylic acid may be one of the unsubstituted acids, i.e., phthalic acid, phthalic anhydride, isophthalic acid and terephthalic acid, or an alkyl substituted acid where the alkyl group contains 1–8 carbon atoms such as t-butylisophthalic acid, isooctylphthalic acid, dimethylterephthalic acid, methylphthalic anhydride, or a halo substituted acid, such as, chlorophthalic acid, dichloroterephthalic acid, bromophthalic anhydride, and iodoisophthalic acid, or diphenyldicarboxylic acid, benzophenone dicarboxylic acid, etc.

The benzene tricarboxylic acid may be trimellitic acid, trimellitic anhydride, hemimellitic acid, hemimellitic anhydride, trimesic acid, benzophenone tricarboxylic acid, diphenyltricarboxylic acid, etc., or a substituted acid such as t-butyl trimellitic acid, methyl trimellitic acid, trichloro trimellitic acid, methyl hemimellitic acid, etc.

The benzene tetracarboxylic acid may be pyromellitic acid, diphenyltetracarboxylic acid, diphenylmethane tetracarboxylic acid, benzophenone tetracarboxylic acid, diphenylsulfone tetracarboxylic acid, anhydrides of these acids such as pyromellitic dianhydride, etc., or a substituted acid such as chloropyromellitic acid, t-butylpyromellitic acid, etc.

When preparing the defined polycondensation reaction product from a benzene polycarboxylic acid having 3 or more carboxyl groups, a monohydroxyl group containing member is commonly employed to react with the acid. This member may be considered a monohydric alcohol (monohydroxyl member) and generally contains one or more ether linkages or it may be an aliphatic alcohol having at least 2 carbon atoms or it may be an ester of a polyol and a fatty acid with the ester having one free hydroxyl group. The ether containing alcohols are preferred, particularly when water solubility is desired in the ultimate product, and include those containing furan and/or tetrahydrofuran rings and the straight chain polyalkylene glycol monoalkyl ethers. The alcohols having the furan and/or tetrahydrofuran rings are especially preferred with the exception of furan methanol (furfuryl alcohol) and similar furan alcohols having a tendency to polymerize. Examples of suitable alcohols having tetrahydrofuran and furan rings are the monohydroxyl tetrahydrofurans such as 3-monohydroxyl tetrahydrofuran, etc., monohydroxyalkylene tetrahydrofurans, especially those having from 1 to about 4 carbon atoms in the alkylene group such as 2-hydroxymethylene tetrahydrofuran, 3-hydroxymethylene tetrahydrofuran, 2-hydroxypropylene tetrahydrofuran, etc.; and esters of tetrahydrofuran and furan substituted aliphatic acids, especially those having from 1 to about 7 and preferably 1 to about 3 carbons atoms in the aliphatic acid group such as the tetrahydrofuran and furan substituted methanoic acids, ethanoic acids, propenoic acids, heptanoic acids, etc. These esters are prepared from the furan and/or tetrahydrofuran substituted aliphatic acids and a polyhydric paraffinic alcohol having at least 2 hydroxyl groups such as the alkylene glycols (ethylene glycol, propylene glycol, pentylene glycol, etc.), and alcohols having 3 or more hydroxyl groups such as glycerol, trimethylol ethane, trimethylol propane, pentaerythritol, etc. Substituted alcohols having tetrahydrofuran or furan rings may also be utilized and include 2,5 dimethyl 2-hydroxymethylene tetrahydrofuran, 2 - ethyl 2 - hydroxypropylene tetrahydrofuran, etc., and esters of 3-chloro 2-tetrahydrofuran methanoic acid, 4 - bromo - 2 - furan methanoic acid, 5-t-butyl-2-furan methanoic acid, etc.

Examples of the polyalkylene glycol monoalkyl ethers include those having from 2 to 8 ether groups, from 2 to 3 carbon atoms in each alkylene group and from 1 to 8 carbon atoms in the alkyl group. Numerous species of these ethers are available commercially under the "Carbitol" trade name and generally considered as alkyl Carbitols. The Carbitols are alkylation reaction products of ether glycols and alkanols. Examples of specific ether glycols are diethylene glycol, triethylene glycol, tetraethylene glycol, and polyethylene glycols containing not more than 8 ether linkages; dipropylene glycol, tripropylene glycol, and polypropylene glycols containing not more than 8 ether linkages. Examples of specific alkanols are methanol, ethanol, isopropanol, n-butanol, t-butanol, t-butyl alcohol, and octanol. The mixtures of isomeric alkanols prepared by the Oxo process are particularly suitable, especially isooctyl alcohol. Examples of the specific nomenclature utilized herein is the alkylation product of diethylene glycol with ethanol which product is known as diethylene glycol monoethyl ether or 2-(2-ethoxyethoxy)ethanol or ethyl Carbitol.

The monohydric alcohol also includes aliphatic alcohols having 2 or more carbon atoms. Particularly suitable are the lower alkanols and the fatty alcohols having from 16 to 24 carbon atoms. Examples of these are ethanol, propanol, decanol, etc. and the polyethenoid fatty alcohols derived by the controlled hydrogenolysis of drying fatty oils.

The monohydric alcohol may also be an ester of a fatty acid and a polyol. The polyol or polyhydric paraffinic alcohol has at least 2 hydroxyl groups. Commonly, these esters are prepared from fatty acids and alkylene glycols such as ethylene glycol and neopentyl glycol, or glycerol, or from the alcoholysis of fatty oils particularly the semidrying or drying oils and glycerol or other 3 or more hydroxyl groups containing materials such as trimethylol ethane, pentaerythritol, etc.

It is to be understood that the above enumeration of reactants for the defined polycondensation reaction product is not exhaustive. The composition includes the variations of resin reactants well-known to the workers in the surface coating art.

The monohydric alcohol is present in a mole ratio to the benzene tricarboxylic acid of from about 0.3 to about 1. When preparing the novel water soluble resins of this invention from the tricarboxylic acid, it is preferred that at least about 0.3 mole of the defined ether containing monohydric alcohol be present, especially the alcohol having a furan or tetrahydrofuran ring. When the benzene tetracarboxylic acid is utilized, the monohydric alcohol should be present in greater amounts up to about 2 moles per mole of the tetracarboxylic acid. Again, the ether containing monohydric alcohol is preferred for water soluble resins and especially the alcohol having a furan or tetrahydrofuran ring.

The defined compound having a fatty acid group and any monohydric alcohol (if present) are added in amounts such that their hydroxyl groups are present in a ratio to the carboxyl groups of the benzene polycarboxylic acid of at least about 0.9. It is understood that this ratio refers to the hydroxyl groups of the compound when a benzene dicarboxylic acid is utilized and that anhydride groups of the polycarboxylic acids are considered equivalent to 2 carboxyl groups. Suitable mole ratios are from about 0.9 to about 1.5, especially from about 1 to about 1.5 and preferably from about 1 to about 1.2.

The polycondensation reaction is carried out in the usual manner. Typically, it is carried out in a vessel provided with a condensing system permitting trapping out of water of reaction. When the benzene dicarboxylic acid is utilized, the reactants (acid and compound) are agitated at a temperature of about 300° F. to about 450° F., more usually about 350 to 400° F. When the benzene tricarboxylic acid and/or benzene tetracarboxylic acid are utilized, the reactants (acid, compound, monohydric alcohol) are agitated at a temperature from about 260° F. to about 340° F. to react the monohydric alcohol with the acid and then at a temperature from about 350° F. to about 450° F. or usually about 350° F.–400° F. The reaction is continued until the desired acid number and cure time are reached or to the point where the viscosity increase of the contents of the reaction zone indicate that the gelation point is being approached.

Another general method can be carried out by reacting the monohydric alcohol with the zenzene tricarboxylic acid at from about 260° F. to about 340° F. and then adding the defined compound containing a fatty acid group to the resin kettle to produce the polycondensation reaction product.

It is advantageous when a high melting acid such as trimesic acid is utilized for the polycondensation reaction product to either dissolve the acid in a suitable solvent and then prepare the polycondensation reaction product, or to heat the acid and compound at about 400–420° F. until an acid number of about 180–200 is reached and then cool the materials to about 300–340° F. and add the monohydric alcohol, after which the solution is heated at 300–340° F. until the desired acid number and cure time are reached.

When the benzene dicarboxylic acid is utilized, the acid number is generally not more than about 20 and commonly not more than about 10 with the cure time being around 80 seconds and below. When the benzene tricarboxylic acid or benzene tetracarboxylic acid is utilized, the acid number is generally somewhat higher such as between about 25 to about 70 and commonly from about 35 to about 60 with the cure time being around 40 seconds and below.

The defined polycondensation reaction product is reacted with the acidic member having the formula $R(X)_n$ wherein R is an organic group or substituted organic group, X is at least one member selected from the class consisting of a carboxyl group, an anhydride group, and a carbonyl halide group, and $n$ is an integer from 1 to about 6 and preferably from 2 to 4 when X is a carboxyl group and a carbonyl halide group, and from 1 to about 3 and preferably from 1 to 2 when X is an anhydride group with R being a non-aliphatic organic group when $(X)_1$ is a single carboxyl group or a single carbonyl halide group.

R may be either an aromatic group, cycloaliphatic group, aliphatic group, or substituted derivative, or it can be a group combining two or more of these groups or it can be a heterocyclic group. The aromatic group includes benzene, benzophenone, phenylbenzene, naphthalene, etc.; the cycloaliphatic group includes cyclopropane, cyclopentane, cyclohexane, cyclohexene, etc.; and the aliphatic group includes ethane, ethene, propane, butane, pentene, heptane, etc. R may also be a substituted organic group provided the substituents are inert in respect to the reactants and reactions. This means that groups such as OH and $NH_2$ are undesirable since they would react with $R(X)_n$ and limit its functionality. Suitable substituted organic groups include chlorobenzene, tetrachlorohexene, chlorobutane, etc. In addition, R may be a heterocyclic group containing oxygen such as furan or nitrogen such as pyridine.

The defined R is part of the $R(X)_n$ molecule. X is a group having acidic characteristics and includes such members as carbonyl groups, anhydride groups and/or carbonyl halide groups such as carbonyl chloride and carbonyl bromide. The number of X groups per R is defined by $n$ which is from 1 to about 6 and preferably preferably from 2 to 4 when X is a carbonyl group and/or carbonyl halide group and from 1 to about 3 and preferably 1 to 2 when X is an anhydride group. The value of $n$ depends generally on the particular R group employed. For instance, when R is an aromatic group such as benzene, and X is an anhydride group, $n$ is a number from 1 to 3.

When a single carboxyl group or carbonyl halide group is attached to R, it is desirable that R be either an aromatic or cycloaliphatic group. These groups in $R(X)_1$ result in satisfactory resins.

It is to be understood that when $n$ is greater than 1, that $R(X)_n$ can include 2 or more of the different acidic groups such as an anhydride group and a carbonyl halide group such as the 4-acid chloride of trimellitic anhydride.

Examples of $R(X)_n$ include (1) the benzene mono and polycarboxylic acids, anhydrides and carbonyl halides such as benzene monoanhydride (phthalic anhydride, t-butyl phthalic anhydride, etc.), naphthalic anhydride, diphenic anhydride, benzophenone anhydride, benzene monocarbonyl chloride, benzene monocarbonyl bromide, benzene monocarbonyl fluoride, benzene dicarboxylic acid (phthalic acid, benzene diacetic acid, etc.) benzene dianhydride (pyromellitic dianhydride), benzene dicarbonyl chloride, benzene dicarbonyl bromide, benzene dicarbonyl iodide, benzene tricarboxylic acid, (trimellitic acid, etc.) benzene trianhydride (mellitic trianhydride), benzene tetracarboxylic acid (pyromellitic acid, etc.), benzene tetracarbonyl chloride, benzene tetracarbonyl bromide, benzene hexacarboxylic acid (mellitic acid), and benzene attached to different X groups such as benzene monocarboxyl monoanhydride (trimellitic anhydride, etc.), benzene monocarbonyl chloride monoanhydride (trimellitoyl chloride anhydride, etc.), (2) the cycloaliphatic mono and polycarboxylic acids, anhydrides and carbonyl halides such as cyclopropane dicarboxylic acid, cyclopentane dicarboxylic acid, cyclohexane monoanhydride (hexahydrophthalic anhydride), cyclohexene monoanhydride (tetrachloro cyclohexene monoanhydride, etc.), cyclohexane monocarbonyl bromide, cyclohexene monocarbonyl chloride, trimethyl cyclopentane dicarboxylic anhydride, cyclohexane dicarboxylic acid (hexahydrophthalic acid, etc.), cyclohexadiene dicarboxylic acid, furan dicarboxylic acid, cyclohexane dicarbonyl chloride, cyclohexene dicarbonyl bromide, cyclohexene dicarbonyl fluoride, cyclohexane tricarboxylic acid, cyclohexane tricarbonyl chloride, cyclohexane tetracarboxylic acid, cyclohexane tetracarbonyl chloride, cyclohexane tetracarbonyl bromide, cyclohexane hexacarbonyl chloride, and the cyclic groups attached to different X groups such as cyclohexane monocarboxy monoanhydride, cyclohexane monocarbonyl chloride monoanhydride, etc.; and (3) the aliphatic monoanhydrides and polycarboxylic acids, anhydrides and carbonyl chlorides. such as ethane dicarboxyl anhydride, ethene dicarboxyl anhydride, ethane dicarboxylic acid (succinic acid, etc.), ethene dicarboxylic acid (maleic acid, etc.), butane tetracarboxyl anhydride (dianhydride), propane dicarbonyl chloride, butane dicarbonyl bromide, butane dicarbonyl fluoride, hexane dicarbonyl iodide, propane tricarboxylic acid, butane trianhydride, decane hexacarboxylic acid, decane dicarbonyl chloride, etc., and the aliphatic groups attached to different X groups such as pentane monocarbonyl chloride monoanhydride, etc. $R(X)_n$ also includes the above mono and polycarboxylic acids, anhydrides and carbonyl chlorides of R having aromatic, cyclic and aliphatic structures such as t-butyl benzene dicarboxylic anhydride, phenyl succinic anhydride, etc. In addition, $R(X)_n$ can have a substituted R group such as chloro benzene, bromo cyclohexane, chlorobutane, etc.

Especially suitable examples of aromatic, cycloaliphatic and aliphatic $R(X)_n$ are phthalic anhydride as an aromatic, hexahydrophthalic anhydride, as a cycloaliphatic, and succinic anhydride as an aliphatic.

The acidic member is reacted with the defined polycondensation reaction product at a temperature below about 350° F. and preferably between about 260° F. and 340° F. until the acidic member is incorporated into the reaction product. This temperature is kept below about 350° F. to limit the reaction between the polyester chains of the polycondensation reaction product during the incorporation of the acidic member. During the heating, the cure time of the solution is usually followed to prevent gelling. Final cure times of 30 and below but above about 6 are suitable. The time required for the reaction of the acidic member varies depending on the temperature, cure time, etc. One indication of the magnitude of the time is a value of about 45 minutes when utilizing phthalic anhydride at a temperature of 260–320° F., an initial cure time of about 33 seconds and a final cure time of about 23 seconds. During the heating, the acid number of the solution changes from a high value after the addition of the acidic member to a lower value as the acidic member is incorporated into the polycondensation reaction product. In many instances, the final acid number is slightly above that of the polycondensation reaction product, but this result depends on the type of polycondensation reaction product and the amount of the acidic member added.

The amount of the acidic member reacted with the defined polycondensation reaction product may be a small amount or larger amounts ranging up to appreciable values. The amount added may be calculated on the basis of the acidic group content or on the basis of the acidic member by weight or on the basis of a particular acidic member such as phthalic anhydride. When using the acidic group content as a basis, the final ratio of hydroxyl groups to carboxyl groups is generally taken into account. This means that when an acidic member having two carboxyl groups (or one anhydride) is utilized with a polycondensation reaction product having the above mentioned ratio of hydroxyl groups to carboxyl groups of from about 0.9 to about 1.5, that the final ratio or revised ratio of hydroxyl groups to carboxyl groups using the two carboxyl groups of the acidic member in the calculation is in the order of from about 0.7 to about 1.3. Another method is on a weight basis. Suitable resins are prepared by adding from about 1% to about 10% by weight of the acidic member to the polycondensation reaction product, or these percentages may be correlated with a particular acidic member such as phthalic anhydride.

The organic solvent soluble resin may be utilized in its organic solvent soluble solution to form air-drying coatings having improved drying properties. The solution preferably contains a cobalt and lead drier to speed up the drying reaction. The various cobalt and lead driers in the paint industry are suitable for this purpose. In addition, the solution may contain pigments such as titanium dioxide and color imparting bodies permitting the lay down of a film of the paint type.

Even though the organic solvent soluble resin is particularly useful in the surface coating field, it is preferred that the resin be converted to a water soluble form permitting the use of water as the vehicle for a true water solvent surface coating affording composition.

WATER SOLUBLE RESIN

The novel water soluble resin is produced by the reaction of the polycondensation reaction product and an alkaline reacting agent. The polycondensation reaction product generally is derived from a benzene polycarboxylic acid having 3 or 4 carboxyl groups. The product and the agent are reacted until a water soluble resin is obtained. Usually enough agent is used to neutralize the acidity of the resin; less may be used. The amount of alkaline reacting material is most readily determined by following the pH of the aqueous medium. The resin passes into solution substantially completely at a pH of about 5. In practically all instances, the resin will be in a complete solution at a pH of about 6. The use of alkaline agent in excess of that needed to bring all the polycondensation reaction into solution is not needed. Suitable ranges of the pH are from 6–9, with the preferred range being from 6–8.

The alkaline reacting agent may be ammonia, alkylamine, heteroamine, or an alkanolamine. Aqueous solutions of ammonia hydroxide are suitable. A particularly useful concentration contains about 2% NH$_4$OH (by weight) since this will generally result in a water soluble resin having the desired pH and a resin content based on the organic solvent soluble resin of about 45% by weight based on the weight of solution. The alkylamines, particularly the lower molecular weight containing not more than 4 carbon atoms in each alkyl group such as triethylamine are suitable. The alkanolamines such as 2-amino-2-methyl-1-propanol ethanolamine and dimethylethanolamine, are especially suitable. The heteroamines, such as morpholine, pyridine, and piperdine may also be used. The type of alkaline agent utilized is determined in part by the characteristics desired in the final water soluble resin; also, by the type of resin product which is to be converted to a water soluble form.

The neutralization reaction is carried out by contacting the resin and the aqueous alkaline reacting medium. It is preferred that the temperature be warm, i.e., maintained in the region of 100–160° F. The two are agitated until the resin has passed into solution. The water solutions of the water soluble resin are clear liquids usually containing some opalescent appearance; the solutions may be colorless or colored, depending on the particular water soluble resin present.

The water soluble resin behaves essentially in the same manner as the solvent soluble resin when exposed to oxygen or air in that an air-dry solid is formed. These water soluble resins produce air-dry coatings having good drying properties. In addition, these water soluble resins have very good storage properties and retain their air-drying properties after storage.

When a paint composition is to be formed, the organic solvent soluble resin is contacted with the defined aqueous alkaline agent and then the desired amounts of a pigment such as titanium dioxide are added. The aqueous solution and the pigment are then mixed. The various cobalt and lead driers in the paint industry may then be added. In addition, color imparted bodies may be utilized to give color in the paint. Many paints prepared from these water soluble resins exhibit very good gloss characteristics.

*Examples*

Typical resins of this invention were prepared and their air-drying properties determined. Their results along with those from comparison resins are set out hereinbelow.

RESIN I

Resin I was prepared in a two liter resin kettle equipped with a thermometer, stirrer, nitrogen bubbler, and a Dean-Stark water trap. 660 grams of safflower oil (0.75 mole) and 153 grams of monopentaerythritol (1.125 moles) were charged to the kettle and heated to about 370° F. and 0.15 gram of litharge added. The temperature was raised to about 460° F. and held for about 40 minutes to prepare the alcoholysis product. The heat was turned off and when the temperature reached about 300° F., 204 grams of tetrahydrofurfuryl alcohol (2.0 moles) and 384 grams of trimellitic anhydride (2.0 moles) were added. Within an hour, the temperature was raised to about 370° F. and was held for about 3½ hours. The water of reaction was continuously removed. The resin had an acid number of about 49 and a cure time of about 33 seconds. This resin had an OH/COOH ratio of about 1.08. 25 grams of phthalic anhydride (0.17 mole) were added to 500 grams of the resin and the combination cooked for 260–320° F. for about 45 minutes. The resulting resin had an acid number of about 56 and a cure time of about 23 seconds. This base resin was converted into a water soluble resin by adding it to an aqueous ammonia solution (about 1.8% by weight as NH$_4$OH) with stirring. A commercial cobalt naphthenate (6% cobalt by weight) and a commercial lead naphthenate (24% lead by weight) were then added (1.35 grams of each drier per every 135 grams of base resin to the solution). Clear films of the resulting solution having a thickness (wet) of about 3 mils became thoroughly dry in 4–5 hours as determined by the test described on page 641, item "2.3 Dry through" of Organic Coating Technology, volume 1, by Henry Fleming Payne.

A comparison resin A was prepared from 300 grams of unmodified resin described above (acid number 49, cure time 33). The unmodified resin was heated until a cure time of about 20 seconds was reached and then converted into a water soluble resin using ammonium hydroxide, the same commercial driers and the same procedures as described for Resin I. Clear films of the solution (resin A) required about 24 hours to become thoroughly dry.

The results of Resin I and resin A demonstrate that the addition of 4% by weight of phthalic anhydride to a resin greatly decreases the time required for its films to dry. Films of Resin I required only 4–5 hours to dry while those of comparison resin A required about 24 hours to dry.

RESIN II

Resin II was prepared from 192 grams of trimellitic anhydride (1.0 mole), 76.5 grams of tetrahydrofurfuryl alcohol (0.75 mole), 532 grams of safflower monoglyceride (1.5 moles), and 37 grams of phthalic anhydride (0.25 mole) with the phthalic anhydride being added after the initial resin was prepared using the procedures described for Resin I except that the preparation of the alcoholysis product was unnecessary. The resulting base resin had an acid number of about 47 and a cure time of about 21 seconds. The resin was converted into a water soluble resin with the ammonium hydroxide solution and the commercial driers described in the procedures for Resin I. Clear films of Resin II dried in about 4 hours.

A comparison resin B was prepared using the same formulation as Resin II. However, the phthalic anhydride was charged to the resin kettle at the same time as the acid, tetrahydrofurfuryl alcohol, and safflower monoglyceride. The base resin had a ratio of OH/COOH equal to 1.06 and an acid number of about 53 and a cure time of about 17 seconds. This resin was converted into a water soluble resin using the same procedures described for Resin II. Clear films of comparison resin B required about 48 hours to become thoroughly dry.

The results from Resin II and comparison resin B demonstrate that the two resins which were prepared differently from the *same* formulations had greatly different air-drying properties. Films of Resin II dried in 4 hours while those of resin B required 48 hours. Resin II differed from resin B in that the phthalic anhydride (about 4.6% by weight based on the initial reactants) was added in a second step, while in resin B the phthalic anhydride (about 4.6% by weight) was added to the initial reactants in the first step. This demonstrates the benefit of the second step addition of the phthalic anhydride.

RESIN III

Resin III was prepared from 192 grams of trimellitic anhydride (1.0 mole), 102 grams of tetrahydrofurfuryl alcohol (1.0 mole), 496 grams of safflower monoglyceride (1.4 moles), 31 grams of neopentyl glycol (0.3 mole), and 74 grams of phthalic anhydride (0.50 mole). The resin was prepared using the same procedures described for Resin I. The initial resin had a ratio of OH/COOH of about 1.5 and a final ratio of OH/COOH of 1.1. The resulting resin had an acid number of about 44 and a cure time of about 17 seconds and was converted into a water soluble resin using the ammonium hydroxide solution and commercial driers described for Resin I. Clear films of Resin III dried in about 4 hours.

A comparison resin C was prepared using the same formulation as Resin III. However, phthalic anhydride was charged to the kettle at the same time as the acid, tetrahydrofurfury alcohol, and safflower monoglyceride. The resin had a ratio of OH/COOH of about 1.5, an acid number of about 49 and a cure time of about 17 seconds. The resin was converted into a water soluble resin. Clear films of resin C required about 30 hours to dry.

The results of Resin III and resin C demonstrate that when about 9% by weight (based on the initial reactants) of phthalic anhydride is added to a resin, the resulting Resin III exhibited superior air-drying properties over those of resin C prepared from an identical formulation in which the phthalic anhydride was added to the initial reactants. Clear films of Resin III dried in about 4 hours while those of resin C required 30 hours to dry.

RESINS IV–VII

A resin was prepared from 330 grams of oiticica oil, 550 grams of soya oil, 0.3 gram of litharge, 136 grams of trimethylol propane (1.0 mole), 92 grams of glycerol (1.0 mole), 265 grams of tetrahydrofurfuryl alcohol (2.6 moles), and 409 grams of trimellitic anhydride (2.1 moles). A first portion of 300 grams was reacted with 12 grams of succinic anhydride, a second portion with 12 grams of trimellitic anhydride, a third portion with 12 grams of hexahydrophthalic anhydride, and a fourth portion with 12 grams of phthalic anhydride. The initial resin had a ratio of OH/COOH of about 1.4 and the final ratio of OH/COOH of the resulting resin slightly lower depending on the anhydride utilized. Each resulting resin was converted into a water soluble resin and the commercial driers of Resin I added. Films of Resin IV (succinic anhydride), Resin V (trimellitic anhydride), Resin VI (hexahydrophthalic anhydride) and Resin VII (phthalic anhydride) dried in approximately 10 hours, 12 hours, 4–5 hours, and 4–5 hours respectively.

These results demonstrate that other acidic materials in addition to phthalic anhydride can be utilized to produce resins exhibiting superior air-drying properties and the comparative air-drying properties between the anhydrides utilized.

RESIN VIII

Resin VIII was prepared from 550 grams of safflower oil, 140 grams of glycerol, 0.2 gram of litharge, 208 grams of tall oil, 288 grams of trimellitic anhydride, 142 grams of tetrahydrofurfuryl alcohol, and 15 grams of tetrachlorophthalic anhydride. The initial resin had a ratio of OH/COOH of 1.12, an acid number of about 50 and a cure time of about 37 seconds. The resin containing the tetrachlorophthalic anhydride had a ratio of OH/COOH of 1.10, an acid number of about 62 and a cure time of about 22 seconds. The tetrachlorophthalic anhydride addition was about 1.1% based on the initial reactants. The resin was converted into a water soluble resin using the ammonium hydroxide solution and the commerical driers described in Resin I. Clear films of Resin VIII dried in about 6 hours.

These results demonstrate that the addition of about 1.1% of tetrachlorophthalic anhydride resulted in a resin having very good air-drying properties.

RESIN IX

Resin IX was prepared from 550 grams of safflower oil, 140 grams of glycerol, 0.2 gram of litharge, 208 grams of tall oil, 288 grams of trimellitic anhydride, 142 grams of tetrahydrofurfuryl alcohol, and about 4 grams of pyromellitic dianhydride based on 200 grams of resin. The initial resin had a ratio of OH/COOH of 1.12, an acid number of about 50, and a cure time of about 37 seconds. The resulting resin had a ratio of OH/COOH of about 1.04, an acid number of about 60 and a cure time of about 24 seconds. The resulting resin was converted into a water soluble resin using the ammonium hydroxide and commercial driers described in Resin I. Clear films of Resin IX dried in about 7 hours.

These results demonstrate that pyromellitic dianhydride added in a second step in the preparation of a resin results in a resin (Resin IX) having very good air-drying properties (7 hours).

RESIN X

Resin X was prepared from 840 grams of tall acid, 240 grams of pentaerythritol, 153 grams of tetrahydrofurfuryl alcohol, 288 grams of trimellitic anhydride and 50 grams of maleic anhydride. The initial resin had a ratio of OH/COOH of 1.1, an acid number of 34 and a cure time of 17 seconds. The resulting resin had a ratio of OH/COOH of 1.0, an acid number of about 49 and cure time of about 14 seconds. The resulting resin was converted into a water soluble resin using the ammonium hydroxide solution and commercial driers described for Resin I. Clear films of Resin X dried in about 5 hours.

These results demonstrate that maleic anhydride added in a second step in the preparation of a resin results in a resin (Resin X) having very good air-drying properties (about 5 hours).

RESIN XI

Resin XI was prepared from 600 grams of soya oil, 109 grams of monopentaerythritol, 0.15 gram of litharge, 312 grams of t-butyl phthalic anhydride, and 15 grams of t-butylphthalic anhydride (added in the second step). The initial resin derived from the benzene dicarboxylic acid (t-butylphthalic anhydride) had a ratio of OH/COOH of 1.04, an acid number of about 9 and a cure time of about 79 seconds. The resulting resin had a ratio of OH/COOH of 0.99, an acid number of about 9 and a cure time of about 24 seconds. The commercial driers described in Resin I were added to a portion of this resin dissolved in mineral spirits. Clear films of the resin dried in about 6 hours.

A comparison resin D was prepared from a portion of the initial resin (acid number 9, cure time 79) used to prepare Resin XI. This resin was cooked for about 8 hours at about 470–580° F. in an attempt to improve its air-drying properties. The resin had an acid number of about 4 and a cure time of about 78, and was dissolved in mineral spirits. The commerical driers of Resin I were added. Clear films of resin D required about 20 hours to dry.

The results of Resin XI and resin D demonstrate that the drying time of a resin derived from t-butylphthalic anhydride can be improved by the second step addition of t-butylphthalic anhydride. Films of Resin XI dried in about 6 hours while those of resin D required about 20 hours.

Additional resins may be prepared similar to those described in the previous examples with the substitution of acid halides such as the di-acid chloride of phthalic acid in place of the other acidic members. The air-drying properties of these resins are superior to the same properties of resins prepared without the second step addition of the acid chloride.

Other desirable properties of the novel water soluble resins of this invention are their good storage characteristics and good retention of drying time after storage. The storage characteristics refer to the number of weeks which the samples of the resins can be stored in 120° F. over. The storage stability of many of the water soluble resins of this invention are 8 weeks minimum and their air-drying properties are virtually unchanged.

Thus having described the invention, what is claimed is:

1. A resin suitable for the formation of an air-drying surface coating film which resin comprises the reaction product of (1) a polycondensation reaction product of (a) a compound affording at least 2 hydroxyl groups and derived from a polyhydric alcohol having 3 hydroxyl groups and an unsaturated fatty acid containing 16–24 carbon atoms, and (b) a benzene polycarboxylic acid having from 2 to 3 carboxyl groups, and when said acid has 3 carboxyl groups, (c) an ether containing monohydric alcohol selected from the class consisting of monohydroxyalkylene tetrahydrofuran having from 1 to about 4 carbon atoms in said alkylene groups, and polyalkylene glycol monoalkyl ether having from 2 to 8 ether groups, from 2 to 3 carbon atoms in each alkylene group, and from 1 to 8 carbon atoms in said alkyl group, the hydroxyl groups of said compound and any alcohol being present in a mole ratio to the carboxyl groups of said acid of about 1–1.2, and (2) an acidic member selected from the class consisting of maleic anhydride, succinic anhydride, phthalic anhydride, hexahydrophthalic anhydride, tetrachlorophthalic anhydride, t-butyl phthalic anhydride, trimellitic anhydride, and pyromellitic anhydride, said acidic member being present in an amount from about 1% to about 10% by weight based on the weight of said polycondensation reaction product, said reaction product being characterized by better air-drying properties than the air-drying properties of said polycondensation reaction product.

2. The resin of claim 1 wherein said acidic member is phthalic anhydride.

3. The resin of claim 1 wherein said polycondensation reaction product is derived from trimellitic acid, a polyol having 3 hydroxyl groups, an unsaturated fatty acid, and having 16–24 carbon atoms, and monohydroxy methylene tetrahydrofuran.

4. A water soluble resin suitable for the formation of an air-drying surface coating film which resin comprises (A) the reaction product of (1) a polycondensation reaction product of (a) a compound affording at least 2 hydroxyl groups and derived from a polyhydric alcohol having 3 hydroxyl groups and an unsaturated fatty acid containing 16–24 carbon atoms, (b) a benzene polycarboxylic acid having 3 carboxyl groups, and (c) an ether containing monohydric alcohol selected from the class consisting of monohydroxyalkylene tetrahydrofuran having from 1 to about 4 carbon atoms in said alkylene group, and polyalkylene glycol monoalkyl ether having from 2 to 8 ether groups, from 2 to 3 carbon atoms in each alkylene group, and from 1 to 8 carbon atoms in said alkyl group, the hydroxyl groups of said compound and alcohol being present in a ratio to the carboxyl groups of said acid of about 1–1.2, and (2) an acidic member selected from the class consisting of maleic anhydride, succinic anhydride, phthalic anhydride, hexahydrophthalic anhydride, tetrachlorophthalic anhydride, t-butyl phthalic anhydride, trimellitic anhydride, and pyromellitic anhydride, said acidic member being present in an amount from about 1% to about 10% by weight based on the weight of said polycondensation reaction product, said reaction product being reacted with (B) an alkaline agent selected from the class consisting of ammonia, alkylamines, heteroamines, and alkanolamines, said resin being characterized by better air-drying properties than the air-drying properties of said polycondensation reaction product reacted with said alkaline agent.

5. The resin of claim 4 wherein said acidic member is phthalic anhydride.

6. The resin of claim 4 wherein said polycondensation reaction product is derived from trimellitic acid, a polyol having 3 hydroxyl groups, an unsaturated fatty acid, and having 16–24 carbon atoms and monohydroxymethylene tetrahydrofuran.

7. The resin of claim 4 wherein said alkaline agent is ammonia.

References Cited by the Examiner

UNITED STATES PATENTS

| 2,319,575 | 5/43 | Agens | 260—77 |
| 2,418,633 | 4/47 | Gould | 260—77 |
| 3,066,108 | 11/62 | Broadhead | 260—77 |

FOREIGN PATENTS

| 131,185 | 1/49 | Australia. |

OTHER REFERENCES

Amoco Chemicals Bulletin, "Trimellitic Anhydride," Sept. 1958.

LEON J. BERCOVITZ, *Primary Examiner.*